Dec. 19, 1944.　　　A. W. SCHORGER　　　2,365,600
STORAGE BATTERY PASTE AND METHOD OF MAKING THE SAME
Filed April 3, 1940
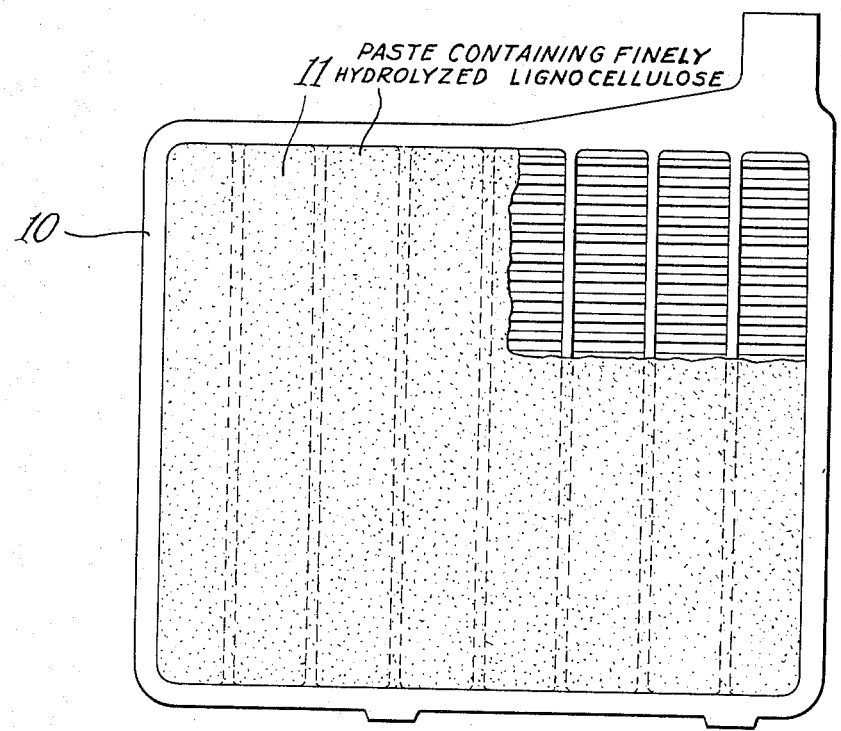
Inventor:
Arlie W. Schorger
By Jesch and Darbo
Attys.

Patented Dec. 19, 1944

2,365,600

UNITED STATES PATENT OFFICE 2,365,600

STORAGE BATTERY PASTE AND METHOD OF MAKING THE SAME

Arlie W. Schorger, Madison, Wis., assignor, by mesne assignments, to National Lead Company, a corporation of New Jersey Application April 3, 1940, Serial No. 327,594

9 Claims. (Cl. 136—26)

This invention relates to storage batteries of the lead-acid type, and particularly to an improvement in the electrodes, or plates, of such batteries, and the method of making such plates, whereby the active material thereof possesses increased capacity and has a longer useful life. This is accomplished by providing an improved expander which is incorporated with the active material.

A storage battery plate ordinarily is prepared by applying a paste of active material to a supporting grid of lead or antimony lead. This paste comprises a finely divided lead compound, usually lead oxide or oxides, such as red lead, litharge, or a mixture of the two, and a finely divided inert material called an expander, moistened with sulphuric acid. Before the negative plate is placed in service it is subjected to a charging operation during which the lead compound is converted into spongy lead. This lead remains in finely divided condition. The inert expander material is mixed with the lead compound, and it is believed that it serves to separate the particles of such compound and prevent the agglomeration of the latter into larger particles, or masses, and in this way, maintains the surface of the active material at a maximum, and increases the capacity and life of the plates.

Various organic materials have been used as expanders, such as humins, humic acids, wood flour, and lignins in various modified forms. One such form is lignin which has been isolated from a natural lignocellulose by the action of strong mineral acids or alkalies. Such lignin has undergone profound change with respect to its properties.

It is the object of the invention to provide an improved expander for storage battery plates in the form of a natural lignocellulose which has been subjected to but a mild hydrolysis and from which the water-solubles produced by such hydrolysis have been removed.

The single figure of the drawing is a conventional representation of a storage battery plate having an active material in accordance with this invention.

In accordance with the present invention, it has been found that an improved expander may be obtained by subjecting a natural lignocellulose to a mild hydrolysis, which may be only a water hydrolysis, and removing the substances rendered water-soluble by the operation. It has been found that an expander possessing a high degree of effectiveness may be thus produced by subjecting the lignocellulose to a minimum of change in this way. The hydrolysis is carried out by heating, or cooking, a subdivided natural lignocellulose at an elevated temperature in a closed container with water or steam. In the course of the hydrolysis, acetic and formic acids are split off from the lignocellulose, and most of the hemicelluloses are rendered water-soluble. After the heating operation is completed, these substances are removed by water-washing, and the residue is dried and reduced by disintegration to a powder which will pass through a 60 mesh, or finer, screen, when it is in condition for use as an expander. The material is under pressure during the heating operation and disintegration may be facilitated by releasing the pressure suddenly.

The proportion of lignin contained in the material is increased to a considerable extent by the present method. This lignin remains in situ, that is, in its natural location upon the cellulose fibers. The admixture of cellulose and lignin in this natural relative position is highly advantageous in that it produces an expander having great efficiency. During the operation of the storage battery, the sulphuric acid dissolves the cellulose gradually, thereby maintaining the paste permeable to the acid, while at the same time, the lignin remains in position and serves to maintain the separation between the particles of lead compound.

A further advantage of the invention is that it does not require a separation of the lignin and the cellulose and involves only a relatively simple hydrolyzing operation. As a result, an economy with respect to time, materials and equipment is realized.

The raw material for the expander may be any natural lignocellulose, such as wood, both hardwoods and softwoods, cornstalks, corncobs, straw, bagasse, etc. Newsprint, containing approximately 70% to 90% of coniferous ground wood, is also suitable. The ground wood therein is in substantially its original or natural condition. This and similar materials are included in the term "natural lignocellulose" when that term, or a similar term, is used herein in the specification and claims. The raw material may be in the form of chips, sawdust, etc., or it may be comminuted to a more finely divided condition.

The hydrolysis of the natural lignocellulosic material may be carried out in several different ways: (1) by treatment with steam or water at an elevated temperature in the presence of an acid-neutralizing agent for the purpose of neutralizing the acetic and formic acids which are split off during hydrolysis; (2) by a similar treatment with steam or water alone, in which the acids which are formed are allowed to remain and effect an extremely mild acid-hydrolysis of the cellulose; or (3) by a similar treatment in the presence of a small amount of a cellulose-hydrolyzing agent, such as an acid, added to the cooking liquor.

In practicing the present invention, the heating or cooking operation may be carried out at a temperature of approximately 150° C. to 225° C. for a period of approximately 5 minutes to 2 hours. The preferred conditions are a temperature of approximately 180° C. to 210° C. and a time of approximately 30 minutes to one hour. When employing a cellulose-hydrolyzing agent, however, the cooking temperature should not exceed 200° C. As a general thing, cooking at a lower temperature for a longer time is equivalent to cooking at a higher temperature for a shorter time.

The preferred procedure is to employ an acid-neutralizing substance during the cook. For this purpose, a small amount of an alkaline material is used, preferably an amount insufficient to effect any appreciable solution of the lignin. The amount should be such that the hydrogen ion concentration of the mass at the end of the cook is approximately between pH 4 and pH 8, preferably between pH 4.5 and pH 6.5. The cooking operation produces a water hydrolysis which causes most of the hemicelluloses to become dissolved but leaves the cellulose and lignin substantially undissolved.

Among the acid-neutralizing agents which are suitable for the purpose are: sodium hydroxide, sodium carbonate, sodium sulphide, potassium hydroxide, potassium carbonate, ammonia, calcium hydroxide, calcium carbonate, magnesium carbonate and magnesium oxide. Those substances are preferred which are readily soluble in water, for example sodium hydroxide, because they penetrate the comminuted lignocellulose rapidly and neutralize the acetic and formic acids as soon as they are set free. Varying amounts of the neutralizing agent may be used, depending upon the kind of lignocellulose raw material which is being employed. From 1% to 6% of sodium hydroxide, based on the air dry weight of the lignocellulose, is suitable. An equivalent amount of the other neutralizing agents may be used. For example, 7.5% of calcium carbonate will serve the same needs as will 6% of sodium hydroxide.

Where the hydrolysis is carried out with water alone, in the absence of an acid-neutralizing agent, varying amounts of acetic and formic acids are split off, depending upon the kind of natural lignocellulosic material employed, but there is sufficient acid present to supplement the water hydrolysis with a very mild acid hydrolysis, with the result that, in addition to the hemicelluloses becoming dissolved, a portion of the cellulose is converted into hydrocellulose.

Where an acid hydrolyzing agent is added to the cooking water, this is added in relatively small quantities to form a dilute solution of the hydrolyzing agent. The cooking produces a relatively mild hydrolysis of the cellulose in addition to the dissolving of the hemicelluloses. Any substantial dissolving of the cellulose is preferably avoided. Cellulose-hydrolyzing agents are known to those skilled in the art, and any suitable agent may be used for the purpose of this invention. Mineral acids, such as sulphuric acid, hydrochloric acid, phosphoric acid, and organic acids such as the aromatic sulphonic acids may be used satisfactorily.

The following are examples of the method for preparing the improved expander in accordance with this invention. These examples are given by way of illustration, and it is understood that the invention is not limited to them.

*Example 1—With acid-neutralizing agent*

Comminuted maple wood is mixed in a digester with an equal weight of an aqueous 5% sodium hydroxide solution, based on the air dry weight of the wood. The contents of the digester are heated indirectly to a temperature of 190° C., and held at this temperature for one hour, when the heating is discontinued. The cooked material is then washed thoroughly with water, dried and ground to the required degree of fineness, and is then ready for incorporation as an expander with lead compound.

*Example 2—With water alone*

Comminuted maple wood is placed in a rotating digester and subjected to the action of steam at a gauge pressure of 200 pounds per square inch. When the contents of the digester have attained the temperature of the steam, approximately 198° C., the steaming action is continued for approximately 30 minutes. In this operation, about 30% of the wood, consisting largely of hemicelluloses, is rendered soluble in water. The cooked material is then washed with water, and the subsequent procedure is the same as in Example 1.

*Example 3—With hydrolyzing agent*

Comminuted maple wood is mixed with an equal weight of a 3% solution of sulphuric acid, and subjected to steam at a pressure of approximately 125 pounds per square inch. After the contents of the digester have attained the temperature of the steam, approximately 178° C., the cooking is continued for 5 minutes. The cooked mass is water-washed, and the subsequent procedure is the same as in Example 1.

The quantity of expander added to the lead compound in preparing the paste for the storage battery plates may be from 0.1% to 1.0% by weight of the lead compound. These proportions are not critical, however, and may be departed from if desired. The particles of expander and lead compound are mixed together thoroughly with sulphuric acid or water to make a paste in which the particles of expander are evenly distributed throughout the lead compound. The paste is applied to the metal grids to form the storage battery plates. In the drawing, a storage battery plate is shown comprising a metal grid 10, composed of lead or antimony lead, and a paste of active material 11 composed of a mixture of the lead compound and the treated natural lignocellulose expander.

The nature of the action imparted by the expander is not fully understood. It is particularly effective in the negative plates in providing increased capacity and longer life. As especial advantage of considerable importance, is a material increase in the initial capacity of the battery to deliver electric energy, even at low temperatures.

I claim:

1. The process of making an expander for storage battery plates of the lead-acid type which comprises mixing finely-divided natural lignocellulose with water, heating said mixture under pressure at a temperature between about 150° C. and about 225° C. for from about five minutes to about two hours and recovering the residual lignocellulose therefrom.

2. The process of making an expander for storage battery plates of the lead-acid type which comprises mixing finely-divided natural lignocellulose in water containing an acid-neutralizing agent in an amount such as to produce after subsequent heating a hydrogen ion concentration approximately pH=4 to pH=8, heating said mixture under pressure at a temperature between about 150° C. and about 225° C. until substantially all the water-soluble portions of said lignocellulose have been dissolved and recovering the insoluble residual lignocellulose therefrom.

3. Method according to claim 2 wherein the acid-neutralizing agent is selected from the group consisting of the hydroxides and carbonates of sodium, potassium and calcium, sodium sulfide, magnesium oxide, magnesium carbonate and ammonia.

4. An expander for storage battery plates of the lead acid type comprising finely-divided treated natural lignocellulose, said treated lignocellulose containing substantially all the natural cellulose and lignin thereof in situ and being substantially free of the water-solubles contained in natural lignocellulose after cooking in water under pressure at a temperature of from about 150° C. to about 225° C.

5. An expander for storage battery plates of the lead-acid type comprising finely-divided treated natural lignocellulose, said treated lignocellulose containing substantially all the natural cellulose and lignin thereof in situ and being substantially free of the water-solubles contained in natural cellulose after cooking in water under pressure at a temperature between about 150° C. and about 225° C. containing an acid neutralizing agent sufficient to produce after cooking a hydrogen ion concentration approximately pH=4 to pH=8.

6. Process of making an active material for storage battery plates of the lead-acid type which comprises mixing finely-divided natural lignocellulose with water, heating said mixture under pressure at a temperature between about 150° C. and about 225° C. for from about five minutes to about two hours and recovering the residual lignocellulose therefrom, washing, drying and mixing said residual lignocellulose with storage battery lead compound.

7. Process of making an active material for storage battery plates of the lead acid type which comprises mixing finely-divided natural lignocellulose in water containing an acid-neutralizing agent in an amount such as to produce after subsequent heating a hydrogen ion concentration approximately pH=4 to pH=8, heating said mixture under pressure at a temperature between about 150° C. and about 225° C. until substantially all the water-soluble portions of said lignocellulose have been dissolved and recovering the insoluble residual lignocellulose therefrom, washing, drying and mixing said residual lignocellulose with storage battery lead compound.

8. Active material for storage battery plates of the lead-acid type comprising predominantly storage battery lead compound and a small amount of finely-divided treated natural lignocellulose, said treated lignocellulose containing substantially all the natural cellulose and lignin thereof in situ and being substantially free of the water-solubles contained in natural lignocellulose after cooking in water under pressure at a temperature of from about 150° C. to about 225° C.

9. Active material for storage battery plates of the lead-acid type comprising predominantly storage battery lead compound and a small amount of finely-divided treated natural lignocellulose, said treated lignocellulose containing substantially all the natural cellulose and lignin thereof in situ and being substantially free of the water-solubles contained in natural cellulose after cooking in water under pressure at a temperature between about 150° C. and about 225° C. containing an acid neutralizing agent sufficient to produce after cooking a hydrogen ion concentration approximately pH=4 to pH=8.

ARLIE W. SCHORGER.